US009130368B2

(12) United States Patent  
Vilar et al.

(10) Patent No.: US 9,130,368 B2  
(45) Date of Patent: Sep. 8, 2015

(54) OVERLOAD PREVENTION SYSTEM TO IMPROVE INTERMITTENT LOAD CAPACITY OF ELECTRIC DRIVE APPLICATIONS

(71) Applicant: Deere & Company, Moline, IL (US)

(72) Inventors: Eric Vilar, Dubuque, IA (US); Joseph Lingle, Dubuque, IA (US); Todd Velde, Dubuque, IA (US); Neal Clements, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 161 days.

(21) Appl. No.: 13/767,322

(22) Filed: Feb. 14, 2013

(65) Prior Publication Data

US 2014/0226240 A1   Aug. 14, 2014

(51) Int. Cl.
*H02H 9/02* (2006.01)
*H02H 7/08* (2006.01)

(52) U.S. Cl.
CPC ...................... *H02H 7/08* (2013.01)

(58) Field of Classification Search
USPC ....................................... 361/24, 87
See application file for complete search history.

(56) References Cited

U.S. PATENT DOCUMENTS

| | | | | |
|---|---|---|---|---|
| 5,587,863 A | * | 12/1996 | Bergstrom et al. | 361/93.9 |
| 5,612,604 A | * | 3/1997 | Veijalainen et al. | 318/727 |
| 5,627,713 A | * | 5/1997 | Takeshi | 361/67 |
| 6,092,927 A | * | 7/2000 | Clemente | 374/163 |
| 6,992,452 B1 | * | 1/2006 | Sachs et al. | 318/434 |
| 7,112,941 B2 | * | 9/2006 | Chrostowski | 318/801 |
| 2003/0107863 A1 | * | 6/2003 | Kelwaski | 361/93.9 |

(Continued)

FOREIGN PATENT DOCUMENTS

| | | | |
|---|---|---|---|
| CN | 102651546 A | * | 8/2012 |
| EP | 1107416 A1 | * | 6/2001 |

(Continued)

OTHER PUBLICATIONS

Zhi Gao; Habetler, T.G.; Harley, R.G.; Colby, R.S., "A Sensorless Adaptive Stator Winding Temperature Estimator for Mains-Fed Induction Machines with Continuous-operation Periodic Duty Cycles," Industry Applications Conference, 2006. 41st IAS Annual Meeting. Conference Record of the 2006 IEEE , vol. 1, no., pp. 448,455, Oct. 8-12, 2006.*

Dino, Adonis and Ketley, Angus, Dynamic Transmission Line Rating—Technology Review, document, ARBN: 072-377-158, ABN: 48-072-377-158, Hydro-Electric Corporation, Jul. 30, 2009, Tasmania, Australia.

*Primary Examiner* — Eduardo Colon Santana
*Assistant Examiner* — Said Bouziane (57) ABSTRACT

An overload prevention system and method for an electric circuit having a plurality of components is disclosed, where each component has a set of pre-computed parameters. For each component, monitored parameters are observed; a limited value is computed using the pre-computed and monitored parameters; and it is determined if the limited value reached a limit. If the limited value reaches the limit; the system limits one of the monitored parameters. Pre-computed parameters can include time constant and rated current; monitored parameters can include current; and limited value can be component temperature. A time constant, rated current and rated temperature can be pre-computed such that the temperature stays at or below the rated temperature when the current is substantially equal to the rated current. Per unit values can also be used such that per unit temperature stays at or below unity when per unit current is substantially equal to unity.

20 Claims, 6 Drawing Sheets

(56) References Cited

U.S. PATENT DOCUMENTS

| | | | |
|---|---|---|---|
| 2003/0111976 A1* | 6/2003 | Kumar | 318/783 |
| 2003/0214770 A1* | 11/2003 | Schimanek et al. | 361/100 |
| 2004/0061481 A1* | 4/2004 | Heinrich et al. | 322/34 |
| 2006/0126250 A1* | 6/2006 | Sychra et al. | 361/103 |
| 2007/0103833 A1* | 5/2007 | Harris, IV | 361/103 |
| 2008/0133116 A1* | 6/2008 | Mischler et al. | 701/113 |
| 2008/0253041 A1* | 10/2008 | Kuivalainen et al. | 361/25 |
| 2009/0168274 A1* | 7/2009 | Doppel et al. | 361/18 |
| 2010/0117580 A1* | 5/2010 | Miwa et al. | 318/472 |
| 2010/0117581 A1* | 5/2010 | Miwa et al. | 318/472 |
| 2011/0080124 A1* | 4/2011 | Sasaki et al. | 318/400.3 |

FOREIGN PATENT DOCUMENTS

| | | | | |
|---|---|---|---|---|
| GB | 2281825 A | * | 3/1995 | |
| JP | 02084010 A | * | 3/1990 | |
| JP | 09084253 A | * | 3/1997 | |
| JP | 2002238147 A | * | 8/2002 | |
| JP | 2010268614 A | * | 11/2010 | |
| JP | 2012175891 A | * | 9/2012 | |

\* cited by examiner

OVERLOAD PREVENTION SYSTEM TO IMPROVE INTERMITTENT LOAD CAPACITY OF ELECTRIC DRIVE APPLICATIONS

FIELD OF THE INVENTION

The present invention generally relates to the field of motorized machinery, and more specifically to an overload prevention system to improve intermittent load capacity of electric drive applications.

BACKGROUND OF THE INVENTION

Overheating can be a problem for machinery when it is run aggressively for an extended period of time. An overload prevention system can be used to monitor operations and protect the machinery from overheating. For example, the current load in the motor of a loader can jump to greater than 1.5 times its rated value when the operator digs aggressively in a pile. This aggressive digging can be a necessary feature of the loader, so the overload prevention system can be designed to allow the aggressive operation for a limited time and then begin to decrease the torque or other output of the loader to prevent the motor or other components from overheating.

An overload prevention system can monitor and control parameters such as current, torque, time constants, etc. for the system to prevent overheating. When controlling these parameters for the entire circuit, the overload prevention system must use the weakest parameters for the circuit to ensure that no component of the circuit overheats. However, the various components of the circuit may have different parameters describing their heating profiles and potential overheating. For example, a motor may have a higher rated current and a lower time constant while cables connecting the motor to other components of the circuit may have a lower rated current and a higher time constant. To protect the entire circuit without risking overheating of either the motor or the cables, an overload prevention system would use the lower current rating of the cables and the lower time constant of the motor. This will protect the entire circuit from overheating but will limit the circuit in performing operations due to limits activated by the overload prevention system. Of course, the circuit may have a plurality of components, not just two, with different heating parameters that can be protected separately.

It would be desirable to have an overload prevention system for preventing overheating of the various components of a circuit that protects the entire circuit from overheating while also allowing the circuit to perform operations with fewer limitations due to the overheating protection.

SUMMARY

An overload prevention method is disclosed for an electric circuit having a plurality of components including first and second components, where the first component has a first set of pre-computed parameters, and the second component has a second set of pre-computed parameters. The overload prevention method includes observing a first set of monitored parameters for the first component; observing a second set of monitored parameters for the second component; computing a first limited value for the first component using the first set of pre-computed parameters and the first set of monitored parameters; computing a second limited value for the second component using the second set of pre-computed parameters and the second set of monitored parameters; determining if the first limited value has reached a first limit or the second limited value has reached a second limit; limiting one of the first set of monitored parameters if the first limited value has reached the first limit; and limiting one of the second set of monitored parameters if the second limited value has reached the second limit.

An overload prevention system for an electric circuit is disclosed that includes a first set of pre-computed parameters for a first component; a second set of pre-computed parameters for a second component; first and second observers and a controller. The first observer monitors a first set of monitored parameters for the first component, and computes a first limited value for the first component using the first set of pre-computed parameters and the first set of monitored parameters. The second observer monitors a second set of monitored parameters for the second component, and computes a second limited value for the second component using the second set of pre-computed parameters and the second set of monitored parameters. The controller determines if the first limited value has reached a first limit or the second limited value has reached a second limit, and limits one of the first set of monitored parameters if the first limited value has reached the first limit, and limits one of the second set of monitored parameters if the second limited value has reached the second limit.

The pre-computed parameters can include a time constant and a rated current. The monitored parameters can include a monitored current. The limited value can be a temperature value of the component, and the limit can be a rated temperature for the component. The first time constant can be significantly different from the second time constant, and/or the first rated current can be significantly different from the second rated current. The first component can be a motor and the second component can be cables.

The first set of pre-computed parameters can include a first time constant and a first rated current, the first set of monitored parameters can include a monitored current, the first limit can include a first rated temperature, and the first limited value can include a temperature value of the first component, where the temperature value of the first component stays substantially at or below the first rated temperature when the monitored current is substantially equal to the first rated current. The second set of pre-computed parameters can include a second time constant and a second rated current, the second set of monitored parameters can include the monitored current, the second limit can include a second rated temperature, and the second limited value can include a temperature value of the second component, where the temperature value of the second component stays substantially at or below the second rated temperature when the monitored current is substantially equal to the second rated current.

The first set of pre-computed parameters can include a first time constant, a first rated current and a first rated temperature, the first set of monitored parameters can include a monitored current, the first limit can be unity, and the first limited value can be a per unit temperature of the first component, where the per unit temperature of the first component stays substantially at or below unity when the monitored current is substantially equal to the first rated current. The second set of pre-computed parameters can include a second time constant, a second rated current and a second rated temperature, the second set of monitored parameters can include the monitored current, the second limit can be unity, and the second limited value can be a per unit temperature of the second component, where the per unit temperature of the second component stays substantially at or below unity when the monitored current is substantially equal to the second rated current.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

An overload prevention technique can be derived from the thermal model of a mass with internal heating and external cooling, given by:

$$\frac{d}{dt}T_{rise}(t) = \frac{1}{C}(Q(t) - HT_{rise}(t)) \quad (1)$$

where T=temperature rise of the mass over ambient (° C.), Q=internal heat (Joules/second), C=heat capacity of the mass (Joules/° C.), and H=heat transfer coefficient to external ambient (Joules/second/° C.). The heating term, Q, can be taken to be due entirely to heat dissipation in the resistive elements of the circuit to be protected using:

$$Q(t) = I^2(t)R \quad (2)$$

where R=electrical resistance (ohms), and I=electrical current (amps RMS). Substituting equation (2) into (1) and solving for the steady state condition at rated current ($I=I_R$) gives the rated temperature rise of the circuit as:

$$T_R = T_{rise}(I_R) = \frac{I_R^2 R}{H} \quad (3)$$

which directly relates $I_R$ and $T_R$, where $I_R$ is the rated current limit and $T_R$ is the temperature rise of the protected circuit when the rated current is applied continuously.

The total temperature of the circuit at steady state is the temperature rise from equation (3) summed with the initial temperature of the circuit when no load is applied, $T_A$:

$$T_{Total} = T_A + T_R = T_A + \frac{I_R^2 R}{H} \quad (4)$$

Figure 1:
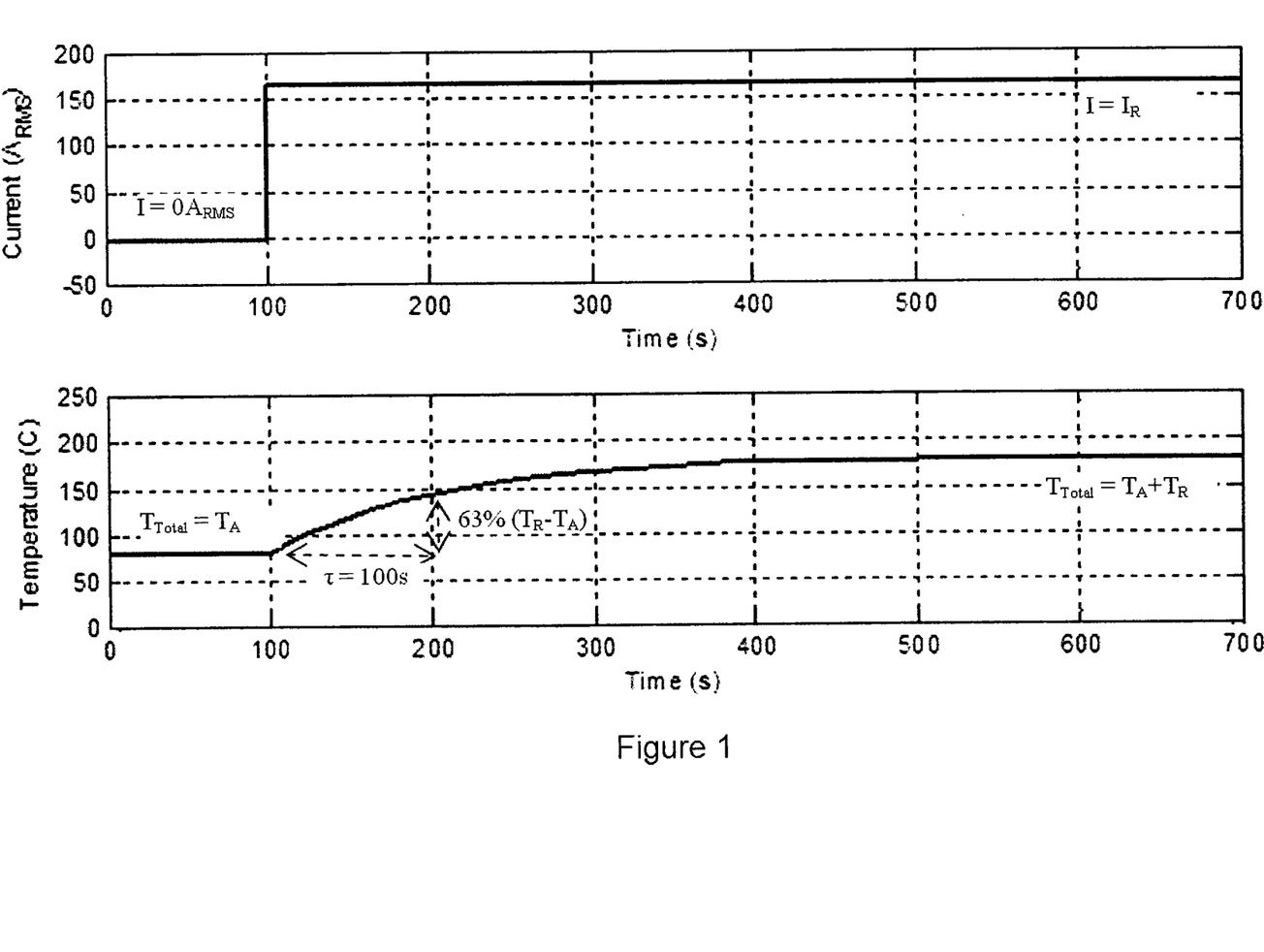
FIG. 1 includes graphs of temperature and current versus time illustrating an exemplary relationship between temperature and current.

$T_A$ can be interpreted as the maximum no load temperature when the maximum ambient and maximum coolant are forcibly applied to the circuit. An exemplary relationship between temperature and current is plotted in FIG. 1 where $T_A$ is the maximum no load temperature prior to the current step being applied; $T_R$ is the temperature rise after the system reaches steady state; and $T_{Total}$ is the sum of $T_A$ and $T_R$. The time constant for the exemplary system of FIG. 1 can be defined as the duration of time for the temperature to rise 63% after $I_R$ is applied which in this case is τ=100 seconds.

An overload prevention technique can also be modeled on a per unit basis by substituting the following definitions into equation (1):

$$T_{pu}(t) = \frac{T_{rise}(t)}{T_R(t)} \quad (5)$$

$$I_{pu}(t) = \frac{I(t)}{I_R(t)}$$

$$\tau = \frac{C}{H}$$

where $T_{pu}$ is the per unit temperature, $I_{pu}$ is the per unit current and τ is the per unit time constant. The resulting per unit relationship of equation (1) is then:

$$\frac{d}{dt}T_{pu}(t) = \frac{1}{\tau}(I_{pu}^2(t) - T_{pu}(t)) \quad (6)$$

Equation (6) shows that at steady state the per unit temperature goes to the square of the per unit current, $$\lim(T_{pu}) \xrightarrow{t=\infty} I_{pu}^2,$$

for a constant current. Using the above per unit relationships, the overload prevention technique can put a limit or clamp on the output current when the per unit temperature exceeds unity.

In different systems, the per unit current may be related to other parameters that are more desirable to monitor or control. For example, the torque of a motor drive may be related to the input current to the motor drive. A per unit torque, for example percent torque, can be used to control the per unit temperature. In this situation, the torque can be monitored and the clamp or limit can be applied to the torque of the motor drive to control the current and keep the per unit temperature generally at or below unity.

Figure 2:
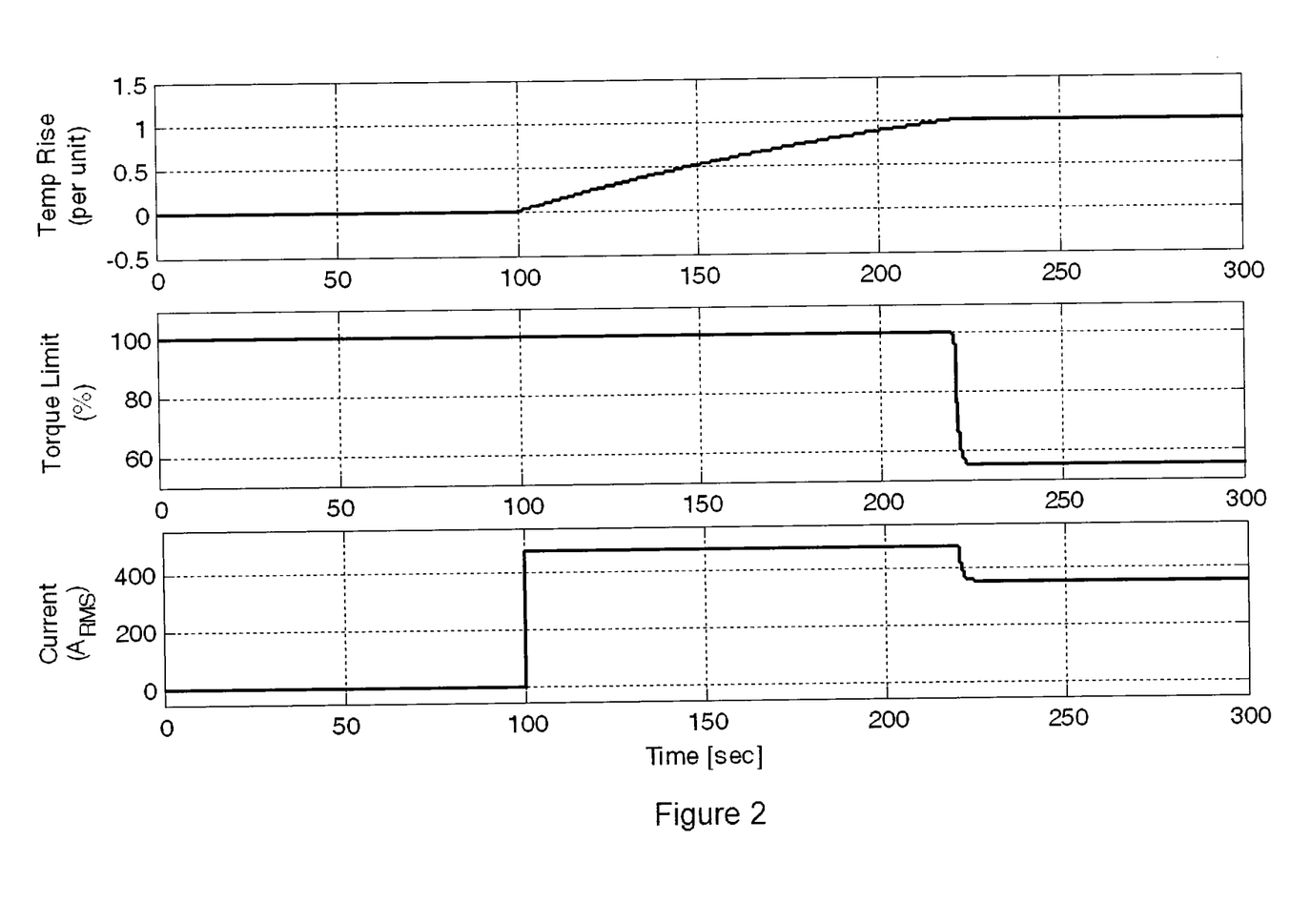
FIG. 2 illustrates an exemplary overload protection system acting on a construction loader sitting idle prior to a peak load event through graphs of RMS current I, a torque limit function, and per unit temperature rise $T_{pu}$ over time.

An example of the overload prevention technique acting on a construction loader is shown in the graphs of FIG. 2, where the bottom graph shows the RMS current I, the middle graph shows the torque limit function, and the top graph shows the per unit temperature rise $T_{pu}$ over time. The scenario of FIG. 2 is exemplary of a loader sitting idle (or working very lightly) for a period of time prior to entering a stall or peak load condition, which could include, for example, the loader pulling or pushing an anchored load like a flat boulder or stump. At time zero, the loader has been sitting idle for an extended duration and the temperate rise is zero, $T_{pu}=0$. At 100 seconds, the loader enters a peak load event and the current jumps to I=475 $A_{RMS}$ and is held constant. Once the increased current is applied, $T_{pu}$ begins increasing until the per unit value reaches unity. Once the per unit temperature $T_{pu}$ reaches unity, the limit function of the overload prevention system forces the input torque and RMS current down to the rated values that keep $T_{pu}$ generally at or below unity. Note that the total peak load duration at maximum current and torque is 120 seconds and that the limit function then forces the current from the peak of 475 $A_{RMS}$ to the rated current of $I_R=351$ $A_{RMS}$, and forces the per unit torque from the peak of 100% to a per unit torque of about 55%.

Figure 3:
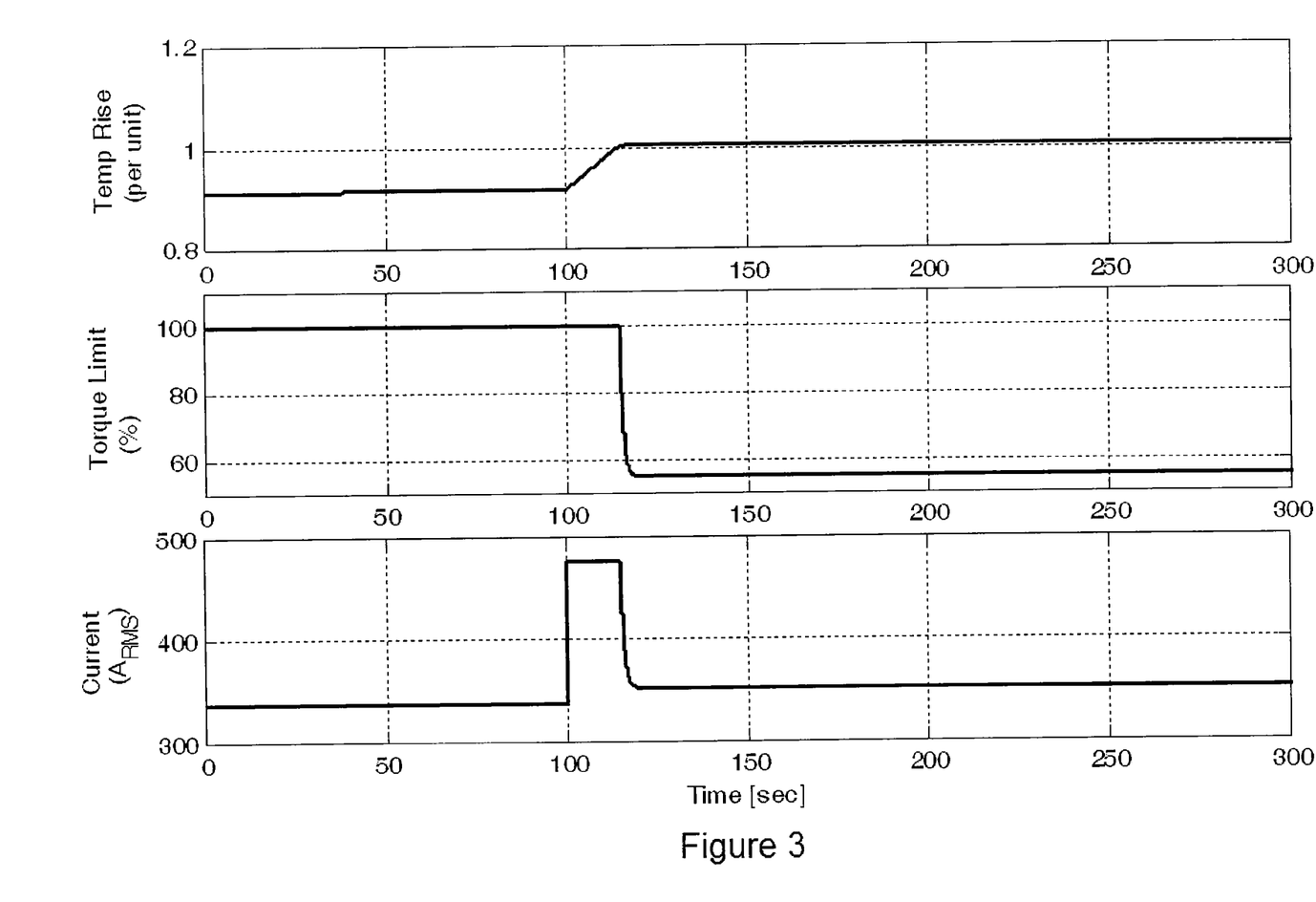
FIG. 3 illustrates an exemplary overload protection system acting on a construction loader running near full power prior to a peak load event through graphs of RMS current I, a torque limit function, and per unit temperature rise $T_{pu}$ over time.

FIG. 2 illustrates that the overload prevention system allows a long duration of peak load when $T_{pu}$ is low prior to the peak load event. However, the current prior to the peak load event is not always low. FIG. 3 shows an exemplary case where a motor is operating at full power before entering a peak load event. As in FIG. 2, the bottom graph shows the RMS current I, the middle graph shows the torque limit function, and the top graph shows the per unit temperature rise $T_{pu}$ over time. In the scenario of FIG. 3, the motor is at full power and is receiving a current of I=335 $A_{RMS}$ generating an already high per unit temperature, $T_{pu}=0.91$ prior to the peak event. Since the system is preheated and has most of its thermal capacity already in use, less time is required for $T_{pu}$ to rise to unity, and the overload prevention system acts sooner and shortens the peak load duration. When the peak load occurs, $T_{pu}$ reaches unity in about 15 seconds and the overload prevention system reduces the input torque and RMS current down to the rated values to keep the per unit temperature $T_{pu}$ from generally rising above unity.

Figure 4:
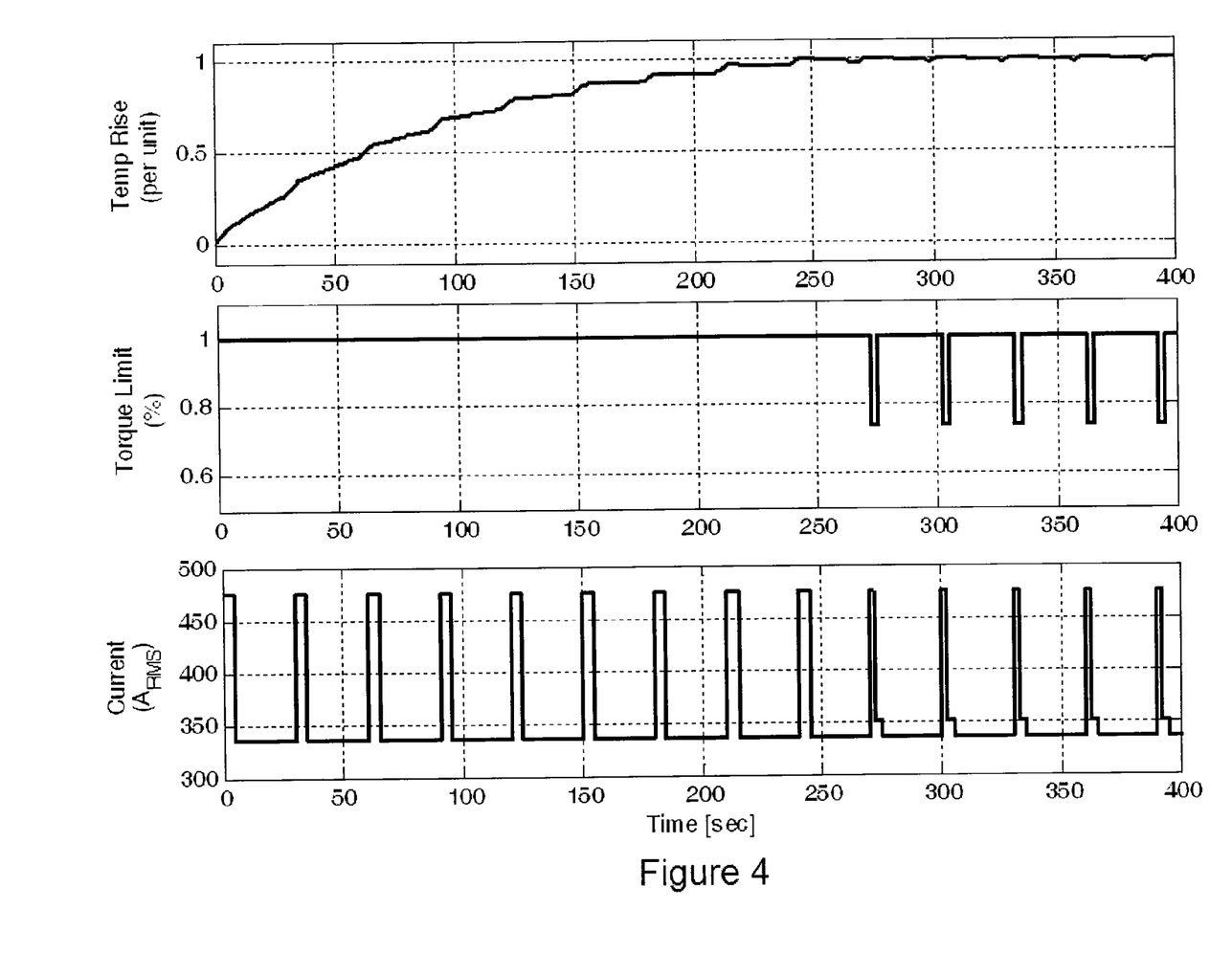
FIG. 4 illustrates an exemplary overload protection system acting on a construction loader performing a cyclic operation that includes a peak load event through graphs of RMS current I, a torque limit function, and per unit temperature rise $T_{pu}$ over time.
Figure 5:
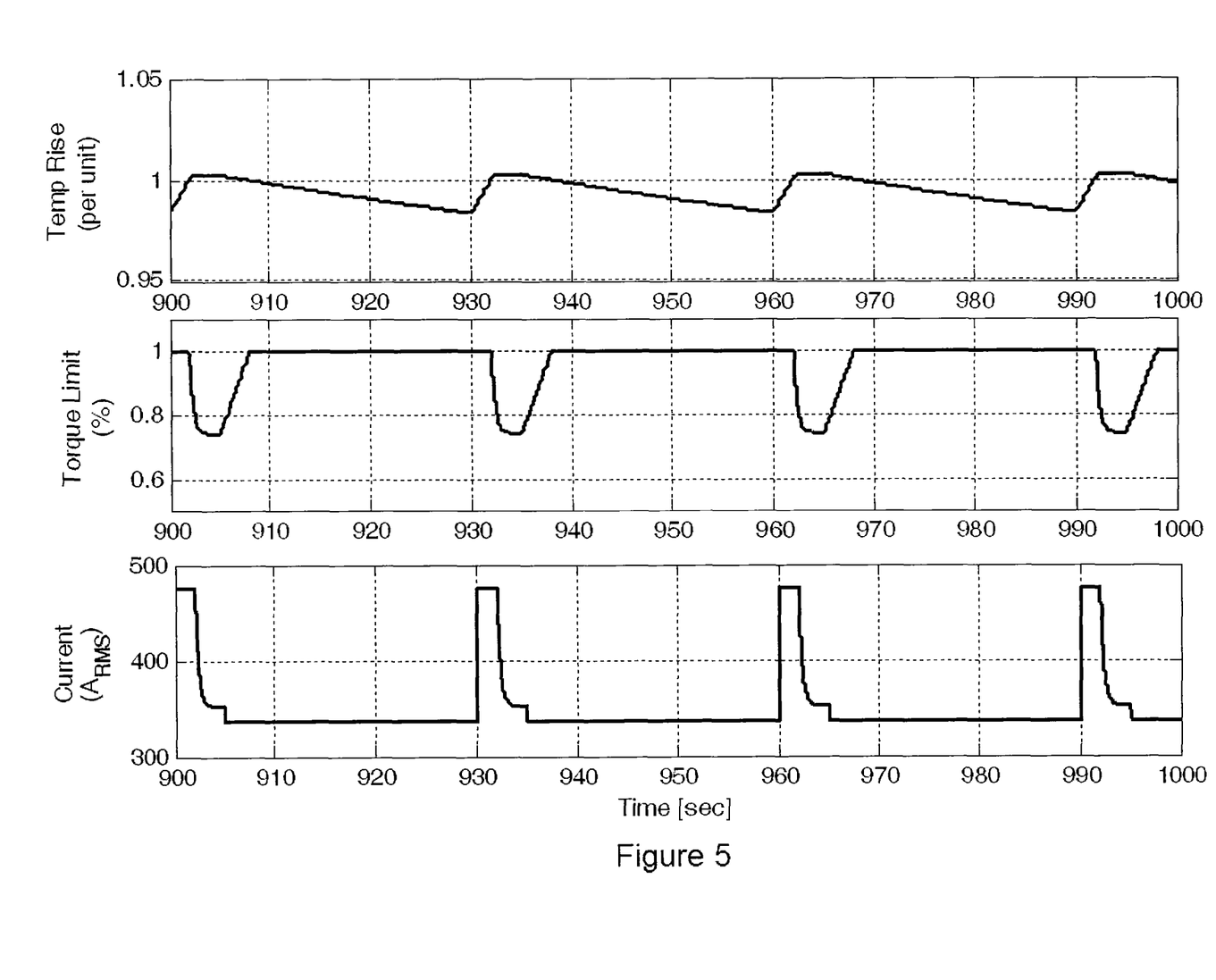
FIG. 5 is a zoomed in view of the graphs of FIG. 4 during steady state operation.

Some applications have load cycles where the same operating pattern is repeated over and over. For example, a loader is operated cyclically when loading a truck: the operator travels to and from a pile digging a load and then emptying the load into the truck. These cyclic patterns can be simplified into mean and peak RMS loads, with the peak load representing stall time in the pile and the mean load representing the remainder of the operation. An example of this type of load profile is shown in FIGS. 4 and 5, where the cyclic operation takes about 30 seconds of which the mean RMS load is applied about 25 seconds and the peak load (stall) is applied about 5 seconds. FIGS. 4 and 5 show the influence of an exemplary overload prevention system on a periodic load cycling between peak load (475 $A_{RMS}$) and mean load (335 $A_{RMS}$) at fixed intervals. Initially the overload prevention system has no influence on the circuit because the per unit temperature is well below unity, but once the per unit temperature reaches unity, the limit function of the overload prevention system keeps the temperature from generally rising further by reducing the amount of peak load time.

Although the load pattern is cyclical, $T_{pu}$ is rising and the temperature rise has a somewhat saw tooth shape. The faster rising edge of the saw tooth occurs when the peak load is applied, and the slower rising edge occurs when the mean load is applied. Near the steady state condition, when $T_{pu}$ reaches unity, the saw tooth wave is centered around an average temperature since during the peak load the circuit is heating and during the mean load the circuit is actually cooling. Once $T_{pu}$ reaches unity, the overload prevention system begins limiting the peak load current and torque downward to increase the amount of time that the circuit has to cool. The limit function increases this cooling time by truncating the peak load duration in each cycle, which in this example is by about 1.5 seconds. FIG. 5 shows a higher resolution portion of FIG. 4 at the steady state condition where the dynamic feedback of the limit function on the current and torque load can be more clearly observed.

Current rating, $I_R$, time constant, $\tau$, and/or other related control parameters can be derived for a circuit so that the hardware can handle the time allowed at peak load by the overload prevention system without derating. The current rating, $I_R$, can be specified as the maximum RMS current in the circuit that can be continuously sustained without causing the circuit or component temperature to exceed the rated temperature, $T_R$, or in other words without causing the per unit temperature, $T_{pu}$, to exceed unity. The current rating can be supplied by the manufacturer or evaluated by testing. The time constant can also be evaluated by testing. The protected device can be forced to its rated current with the maximum ambient conditions forcibly applied. The current can then be reduced, for example by half, and the temperature of the device can be allowed to cool to its new value. The time constant can be calculated as the length of time for the device to cool 63.2% from the hot value to the new cooler value.

The overload prevention system can be applied as an intermittent load regulator for the circuit. Each of the components in a circuit can be rated with a current carrying capacity for continuous loading. Moreover, each component can have a unique maximum rating. For example, the motors/generators in the same circuit can have very different current ratings from the cables. The heat shrink on a cable crimp may reach its rated temperature of 125° C. at only 70% of the rated current of the motor under maximum ambient conditions. However, the cables and their crimps may have a longer time constant than the motor/generators of the circuit. Thus, the motors/generators and cables can have asymmetric time constants and current ratings. The motor/generator time constants can be shorter than the cables and crimps, whereas the motor/generator current ratings can be greater than the cables and crimps. This asymmetry can be advantageous when protecting a circuit with an overload prevention system using two over-current thermal observers without having to redesign (or over design) the individual components.

The overload prevention system can use two over-current thermal observers with asymmetric parameters as opposed to a single over-current thermal observer for the entire circuit, each of the over-current thermal observers protecting separate components in the circuit so that the circuit has improved overload capacity. For example, in a loader application, the motor/generator temperatures rise quickly when a load is applied because the motors/generators have a fast thermal time constant. In comparison, under the same loads, cables and cable terminal temperatures rise slowly because the cables have a slow time constant. The overload prevention system can use one thermal observer to protect the cables and another thermal observer to protect the motor to still prevent overheating but also improve the intermittent load capacity of the circuit.

Figure 6:
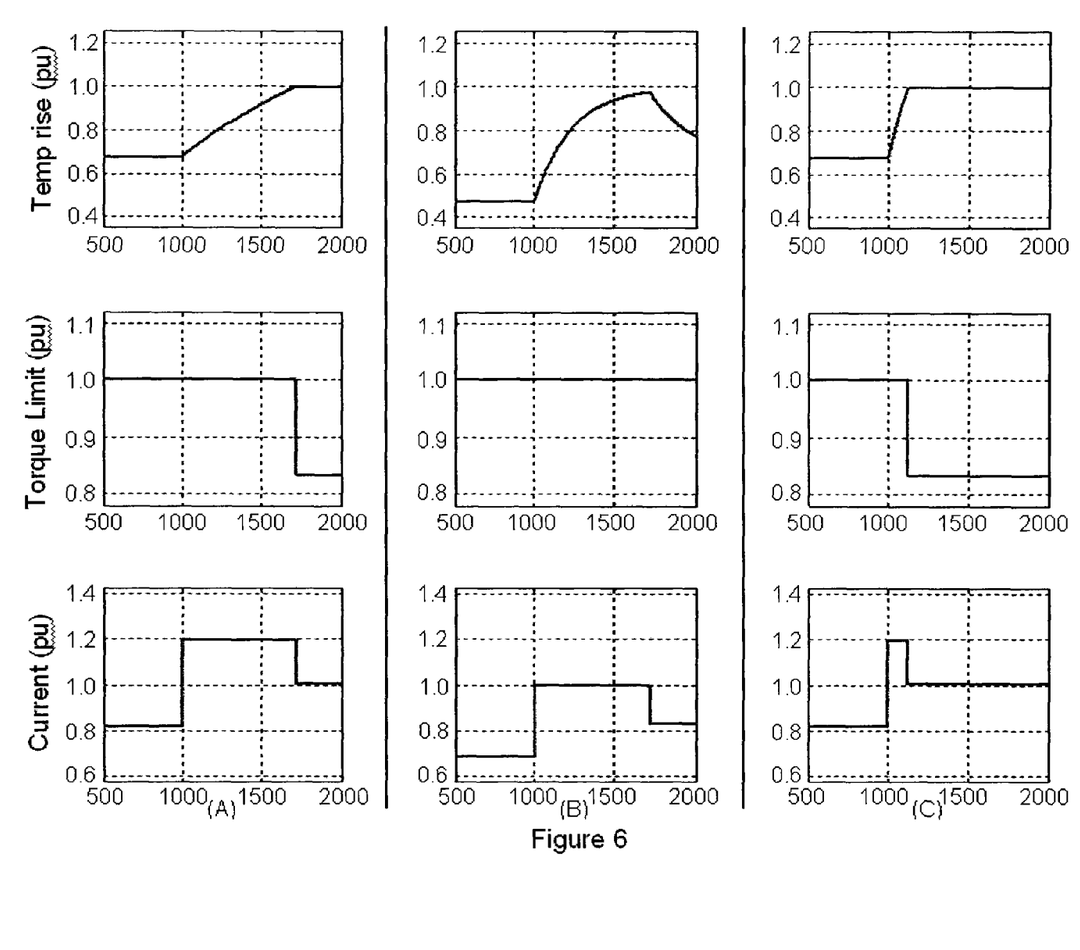
FIG. 6 illustrates the differences in an overload protection system using one thermal observer versus with two thermal observers for an exemplary asymmetric circuit through graphs of per unit current $I_{pu}$, a torque limit function and per unit temperature rise $T_{pu}$ over time.

FIG. 6 illustrates the differences in using one thermal observer versus using multiple thermal observers in an overload prevention system for an exemplary asymmetric circuit. In this example, a loader is at a typical load condition (I=185 $A_{RMS}$) for 1000 seconds and then attempts a peak load condition (I=270 $A_{RMS}$). The exemplary circuit includes a motor and cables, the motor having a rated current of 270 $A_{RMS}$ and a time constant of 230 seconds, and the cables having a rated current of 225 $A_{RMS}$ and a time constant of 1300 seconds.

This example includes two cases for the overload prevention system: a first with one thermal observer for the motor and a separate thermal observer is used for the cables, and a second with one thermal observer for the entire circuit including both the motor and the cables. Using separate thermal observers, one observer monitors the cables and cable terminals, and a second observer monitors the motor/generator and each estimates temperature for the component being monitored from the current sensed in the circuit over time. The thermal observers can use first order thermal models that are mathematically derived from the current rating and time constant for the components being protected. Each observer outputs a temperature and when either temperature nears a predefined limit, for example a unity per unit temperature or a temperature near the rated temperature, the overload prevention system protects the circuit from overload by forcing the current lower through a feedback mechanism that helps keep the temperature from rising further.

The thermal observers can be mathematical models. In this exemplary embodiment the thermal observers take RMS current as input and provide temperature as output. Other inputs can be used by the model, or additional inputs can be used to improve the model fidelity such as current frequency and ambient temperature. The observers can include software features that can be inside the inverter controlling the motor/generator or inside any controller that has knowledge of the monitored parameter(s), for example current, in the motor/generator circuit, for example a transmission control unit (TCU) of a loader.

The graphs in the first column FIG. 6(A) illustrate operation of a thermal observer for the cables, using the longer time constant (1300 seconds) and lower rated current (225 $A_{RMS}$) of the cables. The graphs in the middle column FIG. 6(B) illustrate operation of a thermal observer for the motor, using the shorter time constant (230 seconds) and higher rated current (270 $A_{RMS}$) of the motor. The graphs in the last column FIG. 6(C) illustrate operation of a single thermal observer for the entire circuit (including cables and motor), using the shorter time constant (230 seconds) of the motor and lower rated current (225 $A_{RMS}$) of the cables to protect all components of the circuit. Using multiple thermal observers simultaneously to protect different components allows each routine to make greater use of the available time constant and current rating for the component. Thus, FIG. 6 illustrates:

| 6(A) | cables | $I_R$ = 225 $A_{RMS}$ | $\tau$ = 1300 s |
|---|---|---|---|
| 6(B) | motor | $I_R$ = 270 $A_{RMS}$ | $\tau$ = 230 s |
| 6(C) | motor and cables | $I_R$ = 225 $A_{RMS}$ | $\tau$ = 230 s |

When the overload prevention system uses one thermal observer for the entire circuit, FIG. 6(C), the per unit current (bottom graph) starts at $I_{PU}=I/I_R=185/225=0.82$ and no torque limit (middle graph) is applied to the circuit. At 1000 seconds, the loader starts the peak load condition $I_{PU}=I/I_R=270/225=1.2$ which is greater than the rated current and the per unit temperature (top graph) starts to rise. At 1125 seconds, the per unit temperature reaches unity and the overheating protection routine forces the current back down to the rated current, $I_{PU}=I/I_R=225/225=1.0$, and the torque limit down to 83% to help keep the per unit temperature from rising further. Thus in this example, when using a single thermal observer to protect the asymmetric components (cables and motor) from overheating, the loader was only able to operate at peak current and torque for 125 seconds (2 minutes, 5 seconds).

The overload prevention system using separate thermal observers for the motor and cables in this exemplary circuit is shown in FIGS. 6(A) and 6(B). For the cables, the per unit current (6(A) bottom graph) starts at $I_{PU}=I/I_R=185/225=0.82$ and there is no torque limit (6(A) middle graph) applied to the circuit. For the motor, the per unit current (6(B) bottom graph) starts at $I_{PU}=I/I_R=185/270=0.685$ and there is no torque limit (6(B) middle graph) applied to the circuit. At 1000 seconds, the loader starts the peak load condition which increases the per unit currents to $I_{PU}=I/I_R=270/225=1.2$ for the cables, and $I_{PU}=I/I_R=270/270=1.0$ for the motor. The increased current causes the per unit temperatures for the cables and motor to rise and at 1700 seconds the per unit temperature for the cables reaches unity. Thus at 1700 seconds, the overload prevention system forces the current back down to the rated current for the cables resulting in $I_{PU}=I/I_R=225/225=1.0$ for the cables and $I_{PU}=I/I_R=225/270=0.83$ for the motor and forces the torque limit down to 83% for the cables to help keep the per unit temperature from rising further. In this example, the overload prevention system does not have to impose limits due to the motor because the cable thermal observer indicated the need for limits first, and because the current never went above the rated current for the motor. Thus in this example, when using separate thermal observers to protect the asymmetric components (cables and motor) from overheating, the loader was able to operate at peak current and torque for 700 seconds (11 minutes, 40 seconds).

Therefore, using separate thermal observers to protect the cables and motor allows the circuit to operate at peak current and torque for over 9 minutes longer during the peak event than using a single thermal observer for the entire circuit. The overload prevention system with the single thermal observer protects the circuit but it unnecessarily impedes the time at load capacity of the circuit. The overload prevention system with separate thermal observers still sufficiently protects the circuit but allows increased time at load capacity.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. An overload prevention method for an electric circuit having a plurality of components including a first component and a second component, the first component having a first set of pre-computed parameters, and the second component having a second set of pre-computed parameters, the overload prevention method comprising:
    observing, by a sensor device, a first set of monitored parameters for the first component;
    observing, by the sensor device, a second set of monitored parameters for the second component;
    computing, by a microcontroller, a first limited value for the first component using the first set of pre-computed parameters and the first set of monitored parameters;
    computing, by the microcontroller, a second limited value for the second component using the second set of pre-computed parameters and the second set of monitored parameters;

determining, by the microcontroller, if the first limited value has reached a first limit or the second limited value has reached a second limit;

limiting, by the microcontroller, one of the first set of monitored parameters if the first limited value has reached the first limit; and limiting, by the microcontroller, one of the second set of monitored parameters if the second limited value has reached the second limit.

2. The overload prevention method of claim 1, wherein the first set of pre-computed parameters comprises a first time constant and a first rated current.

3. The overload prevention method of claim 1, where the first set of monitored parameters comprises a monitored current.

4. The overload prevention method of claim 1, wherein the first limited value comprises a temperature value of the first component.

5. The overload prevention method of claim 4, wherein the first limit comprises a rated temperature for the first component.

6. The overload prevention method of claim 1, wherein the first set of pre-computed parameters comprises a first time constant and a first rated current, the first set of monitored parameters comprises a monitored current, the first limit comprises a first rated temperature, and the first limited value comprises a temperature value of the first component, wherein the temperature value of the first component stays substantially at or below the first rated temperature when the monitored current is substantially equal to the first rated current.

7. The overload prevention method of claim 6, wherein the second set of pre-computed parameters comprises a second time constant and a second rated current, the second set of monitored parameters comprises the monitored current, the second limit comprises a second rated temperature, and the second limited value comprises a temperature value of the second component, wherein the temperature value of the second component stays substantially at or below the second rated temperature when the monitored current is substantially equal to the second rated current.

8. The overload prevention method of claim 7, wherein the first time constant is significantly different from the second time constant, or the first rated current is significantly different from the second rated current.

9. The overload prevention method of claim 7, wherein the first component is a motor and the second component is cables.

10. The overload prevention method of claim 1, wherein the first set of pre-computed parameters comprises a first time constant, a first rated current and a first rated temperature, the first set of monitored parameters comprises a monitored current, the first limit comprises unity, and the first limited value comprises a per unit temperature of the first component, wherein the per unit temperature of the first component stays substantially at or below unity when the monitored current is substantially equal to the first rated current.

11. The overload prevention method of claim 10, wherein the second set of pre-computed parameters comprises a second time constant, a second rated current and a second rated temperature, the second set of monitored parameters comprises the monitored current, the second limit comprises unity, and the second limited value comprises a per unit temperature of the second component, wherein the per unit temperature of the second component stays substantially at or below unity when the monitored current is substantially equal to the second rated current.

12. An overload prevention system for an electric circuit, the overload prevention system comprising:

calculating, by a microcontroller, a first set of pre-computed parameters for a first component;

calculating, by the microcontroller, a second set of pre-computed parameters for a second component;

a first observer sensor device monitoring a first set of monitored parameters for the first component, and computing a first limited value for the first component using the first set of pre-computed parameters and the first set of monitored parameters;

a second observer sensor device monitoring a second set of monitored parameters for the second component, and computing a second limited value for the second component using the second set of pre-computed parameters and the second set of monitored parameters;

the microcontroller determining if the first limited value has reached a first limit or the second limited value has reached a second limit, and limiting one of the first set of monitored parameters if the first limited value has reached the first limit, and limiting one of the second set of monitored parameters if the second limited value has reached the second limit.

13. The overload prevention system of claim 12, wherein the first set of pre-computed parameters comprises a first time constant and a first rated current, and the first set of monitored parameters comprises a monitored current.

14. The overload prevention system of claim 12, wherein the first limited value comprises a temperature value of the first component, and the first limit comprises a rated temperature for the first component.

15. The overload prevention system of claim 12, wherein the first set of pre-computed parameters comprises a first time constant and a first rated current, the first set of monitored parameters comprises a monitored current, the first limit comprises a first rated temperature, and the first limited value comprises a temperature value of the first component, wherein the temperature value of the first component stays substantially at or below the first rated temperature when the monitored current is substantially equal to the first rated current.

16. The overload prevention system of claim 15, wherein the second set of pre-computed parameters comprises a second time constant and a second rated current, the second set of monitored parameters comprises the monitored current, the second limit comprises a second rated temperature, and the second limited value comprises a temperature value of the second component, wherein the temperature value of the second component stays substantially at or below the second rated temperature when the monitored current is substantially equal to the second rated current.

17. The overload prevention system of claim 16, wherein the first time constant is significantly different from the second time constant, or the first rated current is significantly different from the second rated current.

18. The overload prevention system of claim 16, wherein the first component is a motor and the second component is cables.

19. The overload prevention system of claim 12, wherein the first set of pre-computed parameters comprises a first time constant, a first rated current and a first rated temperature, the first set of monitored parameters comprises a monitored current, the first limit comprises unity, and the first limited value comprises a per unit temperature of the first component, wherein the per unit temperature of the first component stays substantially at or below unity when the monitored current is substantially equal to the first rated current.

20. The overload prevention system of claim 19, wherein the second set of pre-computed parameters comprises a second time constant, a second rated current and a second rated temperature, the second set of monitored parameters comprises the monitored current, the second limit comprises unity, and the second limited value comprises a per unit temperature of the second component, wherein the per unit temperature of the second component stays substantially at or below unity when the monitored current is substantially equal to the second rated current.

* * * * *